(12) United States Patent
Oh et al.

(10) Patent No.: US 11,903,514 B2
(45) Date of Patent: Feb. 20, 2024

(54) SINGLE SERVE BEVERAGE POD (71) Applicants: Sung Oh, West Covina, CA (US); Guoyong Ye, Foshan (CN)

(72) Inventors: Sung Oh, West Covina, CA (US); Guoyong Ye, Foshan (CN)

(*) Notice: Subject to any disclaimer, the term of this patent is extended or adjusted under 35 U.S.C. 154(b) by 421 days.

(21) Appl. No.: 17/218,002

(22) Filed: Mar. 30, 2021

(65) Prior Publication Data
US 2021/0298514 A1  Sep. 30, 2021

Related U.S. Application Data

(60) Provisional application No. 63/002,245, filed on Mar. 30, 2020.

(51) Int. Cl.
A47J 31/02 (2006.01)
A47J 31/06 (2006.01)

(52) U.S. Cl.
CPC ........... *A47J 31/02* (2013.01); *A47J 31/0642* (2013.01)

(58) Field of Classification Search
CPC .............................. A47J 31/02; A47J 31/0642
USPC ............................................................ 99/295
See application file for complete search history.

(56) References Cited

U.S. PATENT DOCUMENTS

| | | | | |
|---|---|---|---|---|
| 3,937,134 A * | 2/1976 | Molenaar | ................ | A47J 31/02 426/77 |
| 4,069,751 A * | 1/1978 | Gronwick | ................ | A47J 31/02 D7/310 |
| 11,649,108 B2 * | 5/2023 | de Graaff | ........... | B65D 85/8064 99/295 |
| 2011/0271845 A1 * | 11/2011 | Lee | ......................... | A47J 31/02 99/295 |
| 2012/0024162 A1 * | 2/2012 | Chen | ..................... | A47G 19/14 99/316 |
| 2016/0009486 A1 * | 1/2016 | Bugnano | ............. | A47J 31/0668 426/77 |
| 2017/0042361 A1 * | 2/2017 | Kim | .................... | A47J 31/4403 |
| 2017/0156541 A1 * | 6/2017 | Bae | ....................... | B65D 25/38 |
| 2018/0078078 A1 * | 3/2018 | Gormley | ............... | A47J 31/446 |
| 2020/0008604 A1 * | 1/2020 | Fontier | ............. | A47G 19/2272 |
| 2020/0390267 A1 * | 12/2020 | Cook | ......................... | A23F 5/14 |
| 2021/0045571 A1 * | 2/2021 | Banning | ................ | A47J 31/446 |
| 2021/0113010 A1 * | 4/2021 | Bindon | .................. | A47J 31/02 |
| 2021/0330114 A1 * | 10/2021 | Lee | ........................ | A47J 31/002 |
| 2021/0338000 A1 * | 11/2021 | Almagor | ................ | A47J 31/06 |
| 2022/0378242 A1 * | 12/2022 | Glupker | .............. | A47J 31/0631 |
| 2022/0400890 A1 * | 12/2022 | DuPlessis | ............. | A47J 31/468 |
| 2023/0172390 A1 * | 6/2023 | Chiu | ..................... | A47J 31/469 99/298 |

* cited by examiner

*Primary Examiner* — Omar Flores Sanchez
(74) *Attorney, Agent, or Firm* — Viking IP Law; Scott R. Hansen

(57) ABSTRACT

A single-serve pod brews a beverage and drains the beverage from the pod without being obstructed by the brewing mechanism to substantially avoid contaminating the beverage and brewing mechanism. The pod has a proximal end and a distal end, where the heated water enters the pod in the proximal end to extract the beverage from the beverage ingredient within the filter and the beverage exits through the distal end of filter where the flow of the beverage is controlled by one or more retainer walls to slow the flow of beverage along the distal end of the pod, and the beverage is redirected to flow towards the proximal end of the pod where it drains between a gap formed during the brewing process.

34 Claims, 6 Drawing Sheets

SINGLE SERVE BEVERAGE POD

RELATED APPLICATION

This application claims priority to a U.S. Provisional Application No. 63/002,245 filed Mar. 30, 2020, entitled "Single-Serve Beverage Pod," which is hereby incorporated by reference in its entirety.

BACKGROUND OF THE INVENTION

1. Field of the Invention

A single-serve pod may be adapted to control the flow of the beverage draining from the pod; and in particular, at least a portion of the beverage exiting the internal filter may flow through at least one additional slit to reduce the flow rate of the beverage and/or provide a second filtering step thereby minimizing the spattering of the beverage and/or large ground particles from exiting from the pod.

2. Background of the Invention

The following background discussion is not an admission that the matters discussed below are citable as prior art or common general knowledge. Rather, the general background information disclosed herein is directed at describing the problem(s) associated with the current state of the art, and a need for a better solution.

Single-serve pod systems for brewing beverages such as coffee and espresso are popular for their convenience and variety of different flavored beverages offered. One of the problems with such a brewing system is that as the beverage drains from the brewing mechanism, the beverage can spatter thereby leaving droplets of coffee spots around the brewing mechanism, mug, and nearby counter space. Moreover, the added pressure from the heated water injected into the pod may force or push large particles of the beverage ground through the paper filter and/or plastic filter, which can hinder the taste of the beverage such as coffee. In particular, with high pressure brewing systems designed to brew espresso, the filter may need to be made from a hardened material such as plastic, rather than a weak paper filter, to handle the high pressure of about 8 bars or more needed to brew espresso. The high pressure, however, may force the undesirable particle size beverage ground through the holes in the filter and cause the beverage brewed from the pod to have excessive and large particle size sediment such that the overall appearance of the beverage and taste may be hindered. Accordingly, there is a need for a single-serve pod that: (i) minimizes the beverage from spattering as it pours and/or (ii) minimizes excess and large sediments in the beverage brewed from the pod from passing through the holes in the filter and into the beverage.

INVENTION SUMMARY

One of the aspects of the invention is to provide a beverage pod that controls and/or slows the flow of the beverage drained from the pod and/or to reduce the large particles from passing through the filter and allow fine sediments to drain with the beverage. In this regard, the pod may define a lid as a proximal end and a base as a distal end with a longitudinal axis therebetween. The pod may have a filter packed with beverage ingredient within a container enclosed by the lid. The filter has a distal end where the extracted beverage may exit the filter. The distal end of the filter may have at least one retainer wall with slits between the distal end of the filter and the distal end of the pod defining a first pathway for the beverage to pass therethrough where the slits may be arranged to stagger the first pathway to control the flow of beverage exiting the distal end of the filter. Alternatively, the size of the slits may restrict the flow of the beverage to control the flow of beverage exiting the distal end of the filter. In addition, the slits may be utilized to further reduce the large sediments for passing with the beverage while allowing fine or micro sediments to pass with the beverage as the beverage flows along the first pathway. The pod may then direct the flow of the beverage from the distal end to the proximal end of the pod and drain from the proximal end.

Another aspect of the invention is to provide a beverage pod having a proximal end and a distal end, the pod comprising: (i) a container with a rim defining an opening on the proximal end, (ii) a base on the distal end, and (iii) a sidewall between the rim and base; a filter with an extension defining an opening on the proximal end, a base with holes adjacent to the base of the container, at least one retainer wall with slits between the base of the filter and the base of the container, and a sidewall between the extension and the base of the filter, where the extension is peelably coupled to the rim; a beverage ingredient disposed within the filter; a lid enclosing the beverage ingredient within the filter, and the lid adapted to be pierced to inject water into the filter; and a beverage pathway when the lid is pierced and a gap is formed between the extension and the rim about the proximal end and the extracted beverage exits the holes, a first pathway through the slits about the distal end; a second pathway between the sidewalls of the filter and the container, and drains from the gap about the proximal end.

Still another aspect of the invention is to provide a method of brewing a beverage from a beverage pod having a lid as a proximal end and a base as a distal end defining a longitudinal axis therebetween, the method comprising: orientating a pod in a brewing orientation, the pod having a filter disposed within a container where an extension of the filter overlaps a rim of the container, and the extension is peelably coupled to the rim on the proximal end of the pod; forming a gap between the extension and the rim at about a six o'clock position of the extension at the proximal end of the pod; receiving heated water at the proximal end of the pod; extracting a beverage from a beverage ingredient within the filter; filtering the extracted beverage at a distal end of the filter; slowing the flow of the beverage along a first pathway between the distal end of the filter and the distal end of the pod; directing the flow of the beverage along a second pathway from the distal end of the filter to the proximal end of the pod; and draining the beverage from the gap at the proximal end of the pod.

BRIEF DESCRIPTION OF THE DRAWINGS

The invention can be better understood with reference to the following drawings and description. The components in the figures are not necessarily to scale, emphasis is instead placed upon illustrating the principles of the invention. Moreover, in the figures, the referenced numerals designate the corresponding parts throughout the different views.

DETAILED DESCRIPTION OF THE INVENTION

The various aspects of the invention can be better understood with reference to the drawings and descriptions described below. The components in the figures, however, are not necessarily to scale, and emphasis is instead placed upon illustrating the principles of the various aspects of the invention. The claimed invention is not limited to apparatuses or methods having all of the features of any one apparatus or method described below or to features common to multiple or all of the apparatuses described below. The claimed invention may reside in a combination or subcombination of the apparatus' elements or method steps described below. It is possible that an apparatus or method described below is not an example of the claimed invention. In general, when the terms "may", "is", and "are" are used as a verb in the description corresponding to a particular subject matter, these terms are generally used in this disclosure as an expression of a possibility of such subject matter rather than as a limiting sense such as when the terms "shall" and "must" are used. For example, when the description states that the subject matter "may be" or "is" circular, this is one of many possibilities, such that the subject matter can also include an oval, square, regular, irregular, and any other shapes known to a person ordinarily skilled in the art rather than being limited to the "circular" shape as described and/or illustrated in the corresponding referenced figure(s). In addition, when the term "may", "is", and "are" are used to describe a relationship and/or an action, these terms are generally used in this disclosure as an expression of a possibility. For example, when the description states that a subject matter A "may be" or "is" adjacent to a subject matter B, this can be one of many possibilities including the possibility that the subject matter A is not adjacent to the subject matter B or that the subject matter A may be connected, coupled, or engaged with the subject matter B as it would be understood by a person ordinarily skilled in the art.

Moreover, it is within the scope of the invention to combine the various embodiments disclosed relating to one or more particular drawings and their corresponding descriptions with one or more of the other drawings and their corresponding descriptions disclosed herein and/or other references incorporated herein by reference where such a combination may be combined and practiced by one ordinarily skilled in the art. The phrase "single-serve beverage pod" or "beverage pod" or the like in this disclosure generally refers to a single brewing process where a desired volume of beverage is brewed to serve one cup of beverage, however, it is within the scope of the invention to have a pod that packs sufficient beverage substance to brew multiple cups of beverage from a single brewing process or from multiple brewing processes. Also, the term "beverage substance" or "beverage ingredient" or the like generally refers to the underlying article when mixed with liquid such as water formulates a beverage such as coffee, tea, fruit drinks, punch, lemonade, soda, cocoa, milk, soup, energy drink, liquid medicine, *Cannabis*, and the like. For instance, for coffee, the beverage substance may be coffee ground, instant powder coffee, and/or concentrated coffee in liquid form that can be diluted with water for consumption. For tea, the beverage substance may be tea ground, instant powder tea, and/or concentrated tea in liquid form that can be diluted with water for consumption. For baby milk, the beverage substance may be milk powder or concentrated milk liquid. For medicine such as for the flu or cold, the beverage substance may be in the powder or liquid form which can be dissolved with a predetermined portion of the heated water to brew a proper portion of the liquid medicine. *Cannabis* may be also provided in dried ground or powder form. In addition, the beverage substance may be provided in the form of pellets that are infused with desired flavors; and once the pellets are exposed to liquid such as water, the trapped flavors may be released by the pellets, which are then absorbed by the mixing liquid to formulate a beverage with the desired flavor. As such, the beverage substance may be in the form of ground, powder, liquid, pellets, and the like; and the beverage substance may be formulated from single or multiple ingredients. The same referenced numerals referred to in the drawings and descriptions generally correspond to the same or similar parts throughout the disclosure.

Figure 1A:
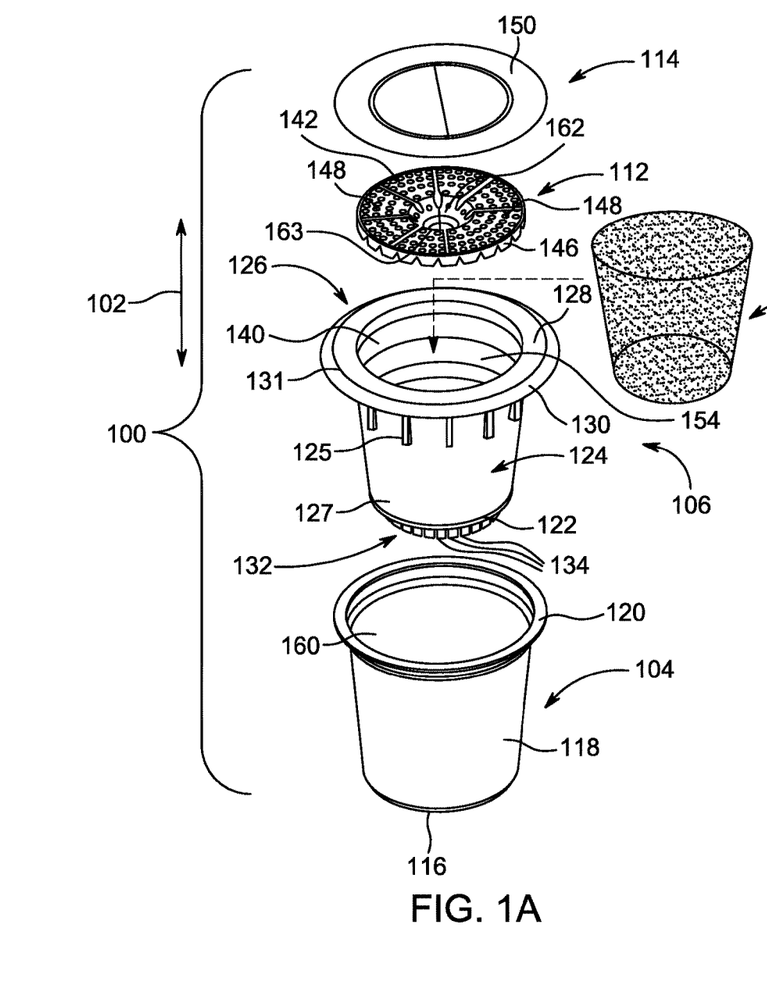
FIG. 1A shows an upright expanded perspective view of a pod along a longitudinal axis.
Figure 1B:
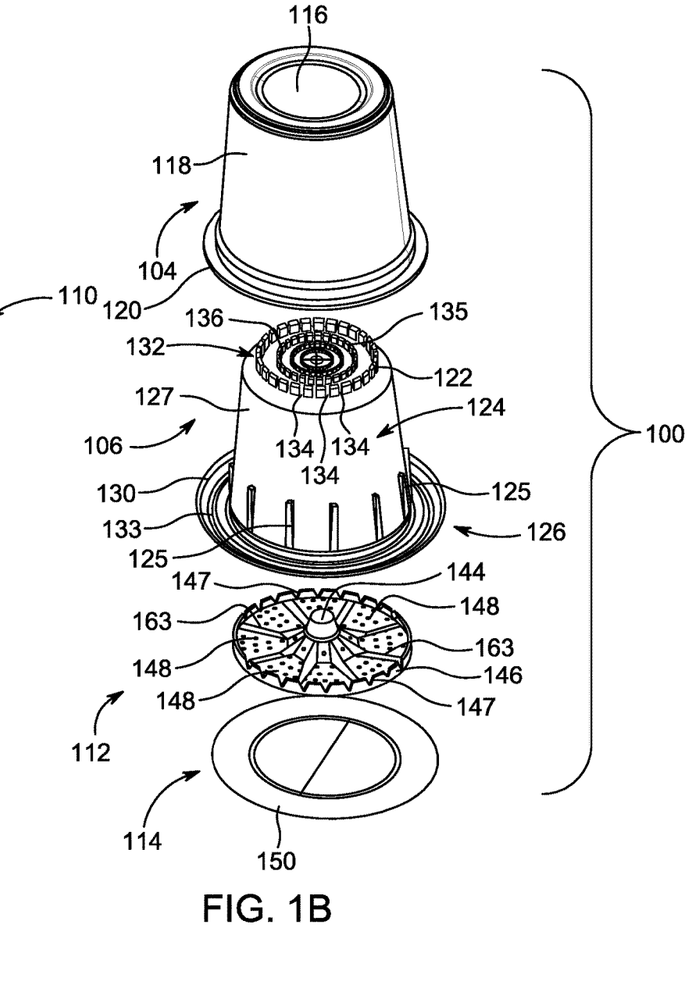
FIG. 1B shows an inverted expanded perspective view of the pod of FIG. 1A.

FIG. 1A shows an upright expanded perspective view of a pod 100 along a longitudinal axis 102 configured to brew beverages such as coffee and espresso; and FIG. 1B shows an inverted expanded perspective view of the pod 100 along the axis 102 to show the top and bottom views, respectively, of the various components of the pod 100. The pod 100 may include a container 104, a filter 106 adapted to receive beverage ingredient 110, a distributor 112, and a lid 114. The container 104 may have a base 116 that extends upwardly to form a sidewall 118 and then extends outwardly to form a rim 120 defining an opening 160. The container 104 may be formed from a variety of materials and from single or multilayered sheets sandwiched together to form a hermitically sealed barrier to protect the beverage ingredients contained therein from atmospheric oxygen entering the container. The container may be formed from a variety of materials known to one skilled in the art. In this regard, the container 104 may be formed in a manner described in U.S. Pat. No. 10,336,498 (the "'498 patent") issued Jul. 2, 2019, entitled "CONTAINER WITH IMPROVED PUNCTURE-ABILITY", by Foster et al., which is hereby incorporated by reference in its entirety. In particular, the container 104 may be formed by a molding and thermoforming process of thermoplastic material, which may be substantially impermeable and imperforate. For example, the thermoplastic materials may include polyolefins such as polypropylene and polyethylene, polystyrene, nylon, and other polymers; and in particular, thermoplastic material may be a bio-based resin, readily recyclable, and/or comprise of at least a portion of recycled material such as a recycled polypropylene base resin.

The filter 106 may have a base 122 that extends upwardly to form a sidewall 124 and then extends outwardly to form an extension 126, which may be defined by one or more sections including a first section 128 and a second section 130. The first extension 128 may define an opening 154 adapted to receive the beverage ingredient 110. The first section may extend outwardly to a predetermined distance indicated by a reference numeral 131, and the second section 130 may extend farther therefrom outwardly in a beveled manner or downward sloping manner relative to the first section 128 towards the base 122. The extension 126 may have a line of weakness 133 between the first and second extensions 128 and 130 to allow the second extension 130 to weaken or separate from the first section 128 along the line of weakness 133, if desired. As discussed in more detail below, the line of weakness may allow the first section 128 to separate more readily from the rim 120 of the container. The first section 128 may extend outwardly at a distance, as indicated by the reference numeral 131, such that the first section 128 may extend farther out laterally than the rim 120 to allow the first section 128 to lay upon or overlap the rim 120 when the filter 106 is placed within the container 104. The base 122 of the filter 106 may have a plurality of holes 136 where the size and number of the holes 136 may be predetermined to control the flow of the beverage through the holes 136 to provide a desired pressure within the filter 106, as discussed in more detail below. The base 122 may also have at least one retainer wall 132 with a plurality of slits 134, as discussed in more detail below.

The container 104 may be adapted to receive the filter 106 and the first section 128 of the extension 126 may be releaseably sealed or adhered to the rim 120 of the container 104 where upon a force applied to the underside of the second section 130, the first section 128 may peel, separate, and/or snap off from the rim 120. Note that these terms may be interchangeably used in this application. In this regard, the releasable bond(s) may be utilized such as the embodiments disclosed in US Published Application No. 2014/0161936, published Jun. 12, 2014, entitled CONTAINER WITH REMOVALE PORTION by Trombetta et al., which is hereby incorporated by reference in its entirety. Alternatively, the first section 128 of the filter 104 may be ultrasonically sealed to the rim 120 of the container 104 such as the torsional ultrasonic method where high-frequency vibrations are applied tangentially as provided by Telsonic Ultrasonics Inc., located at 14120 Industrial Center Dr., Shelby Township, Mich. 48315 U.S.A.

The distributor 112 may have a base 142 with an outer flap 146 adapted to engage with the inner side 140 of the sidewall 124 of the filter 106 such that the base 142 may be adjacent to the first section 128 of the extension 126. The flap 146 may extend upwardly and/or downwardly to engage with the inner side 140 of the sidewall. The base 142 may have a protrusion 144 extending towards the inner space within the filter 106. The protrusion 144 may form a cavity 162 sized to receive an inlet liquid injection member, as discussed in more detail below, such as an inlet needle to inject heated water into the filter 106. The base 142 may have a plurality of holes 148 to allow the heated water to pass therethrough to substantially distribute the water over the opening 154 of the filter 106. The size of the holes 148 may be less than the average size of the beverage ingredient 110. This may substantially prevent the beverage ingredient 110 from entering the protrusion area 144 thereby substantially preventing the beverage ingredient from clogging the inlet injection member, which can cause the brewing mechanism to malfunction.

The sidewall 124 may have one or more ribs 125 extending outwardly. The extending ribs 125 may be formed on the exterior side 127 of the sidewall 124 adjacent to the extension 126. As the filter 106 is inserted into the container 104, the extending ribs 125 may engage with the sidewall 118 of the container 104 to center the filter 106 relative to the container 104 such that the filter 106 may be substantially aligned with the filter 106 along the axis 102 of the pod 100. The distributor 112 may be placed over the beverage ingredient packed within the filter 106 and the flaps 146 may be engaged or sealed within the interior side 140 of the sidewall 124 of the filter 106 such that the beverage ingredient 110 may be substantially compact between the distributor 112 and the base 122. The distributor 112 may have a flange 146 with cutouts 147 around the circumference of the flange 146 to allow the outer area of the distributor 112 to flex and bend. The protrusion 144 may have an inverted bell like shape to enlarge the area of the cavity 162 adapted to receive the inlet member of the brewing mechanism. The enlarged cavity 162 may also allow the outer area of the distributor 112 to flex and bend more readily.

The manner in which the beverage ingredient is packed within the filter 106 may be predetermined to control the density of the beverage ingredient 110 therein to substantially prevent air pockets, gaps, and channels from forming within the ingredient 110 during manufacturing, shipping, handling, and during the brewing process. As a general rule, beverage ingredient 110 with greater density may require greater pressure to push the heated liquid through the beverage ingredient 110, which can extract more intense flavor from the beverage ingredient 110 in less time. Once the first section 128 of the filter 106 is separated from the rim 120, as discussed in more detail below, the distributor 112 may flex to substantially contain the ingredient 110 within the filter 106 to avoid forming air pockets therein. The lid 114 may be placed over the filter 106 and the outer edge 150 of the lid 114 may be sealed and/or bonded to the first section 128 of the filter 106. In particular, the lid 114 may be formed from a flexible liner with sufficient tensile strength to resist tearing due to the high pressure during the brewing process.

The pressure developed within the beverage ingredient 110 can determine the type of beverage brewed such as coffee under lower pressure and espresso under higher pressure. A number of other factors can determine the pressure developed within the beverage ingredient 110 such as the pressure and temperature of the heated water injected into the beverage ingredient, the grind size and density of the beverage ingredient, the size and number of holes 136 in the base 122 of the filter 106, the depth of the beverage ingredient, and etc. The base 122 may have a predetermined number of holes sized to allow the beverage to pass therethrough but substantially prevent the beverage ingredient packed within the filter 106 from passing through the holes due to pressure within the filter during the brewing process. For instance, the sidewall 124 may be substantially solid to direct most of the beverage, if not all, to pass through the holes 136 on the base 122. Moreover, the stiffeners 125 extending from the sidewall 124 may substantially maintain its shape under the desired brewing pressure conditions. The number and/or size of the holes 136 formed in the base 122 may be predetermined to provide sufficient resistance to flow of beverage to develop the desired brewing pressure within the beverage ingredient to brew a desired beverage. For example, to brew espresso under high pressure from about 6 to 15 bars, the coffee beans may be finely grounded where the average grind size may be from about 40 to about 450 microns, and to brew coffee under low pressure from about 1 to 4 bars, the coffee may be grounded more coarsely where the average grind size may be from about 500 to about 1,000 microns; and to substantially prevent the grinds from passing through the holes, the size of the holes 136 may be less than the average grind size of the coffee grounds. The holes may have a variety of shapes such as circular, square, rectangular, regular and irregular configuration.

Along with the size of the holes 136, the number of holes 136 provided in the base 122 may be predetermined to develop the desired pressure within the filter 106 to brew the intended beverage such as espresso or coffee. That is, the brewing mechanism may inject heated water into the pod 100 at a pressure up to about 19 bars but some of the pressure may be released through the coffee ground and through the filter 106 such that the espresso flavor beverage may be extracted from the finer coffee ground at about 8 bars, for example, with the difference of 11 bars of pressure being released. That is, the pressure within the filter may largely depend upon the size of the beverage ingredient and the size and number of holes 136. For instance, for low pressure coffee, coarser ground coffee may be packed within the filter 106 and the size and number of holes 136 may be greater than that of the holes 136 to brew espresso, and substantial pressure may be released through the coffee ground and through the filter 106 such that coffee may be extracted from the coarser coffee ground at about 3 bars, for example, with the difference of 16 bars of pressure being released.

In general, for low pressure coffee, the size of the holes 136 may be less than an average grind size or less than the lower end of the distribution of the grind sizes to brew coffee where the average grind size may be from about 450 to about 1,000 microns; and in particular from 500 to about 700 microns. Note that some soluble may have an average grind size of about 1,000 to 2,500 microns. For instance, coffee ground may have grind size distribution from 500 to 700 microns with an average or mean grind size of about 600 microns. With such grind size distribution and average, the size of the holes 136 to brew coffee may be less than about 600 microns or less than 500 microns to substantially prevent coffee ground from passing through the holes and to release the pressure within the coffee grounds to brew coffee. Alternatively, the pod 100 may include a paper filter between the holes 136 and the coffee ground, although not necessary, to allow the beverage to pass while preventing the smaller coffee sediments from passing therethrough during brewing process. Moreover, it is within the scope of the invention to have the size and number of holes 136 in the base 122 to be independent of the grind size of the beverage ingredient 110 where the size of the holes 136 may be sized to substantially prevent the ingredient sediment from passing through the holes 136.

FIG. 1B shows at least one retainer wall 132 extending from the base 122. In particular, the base 122 may have a plurality of retainer walls 132 extending therefrom with layers of retainer walls 132 forming a pathway between two adjacent retainer walls 132, and with a plurality of slits 134 on each of the retainer wall 132, as discussed in more detail below. The retainer walls 132 may have distal ends 135 that contour the shape of the inner side of the base 116 of the container 104.

Figure 1C:
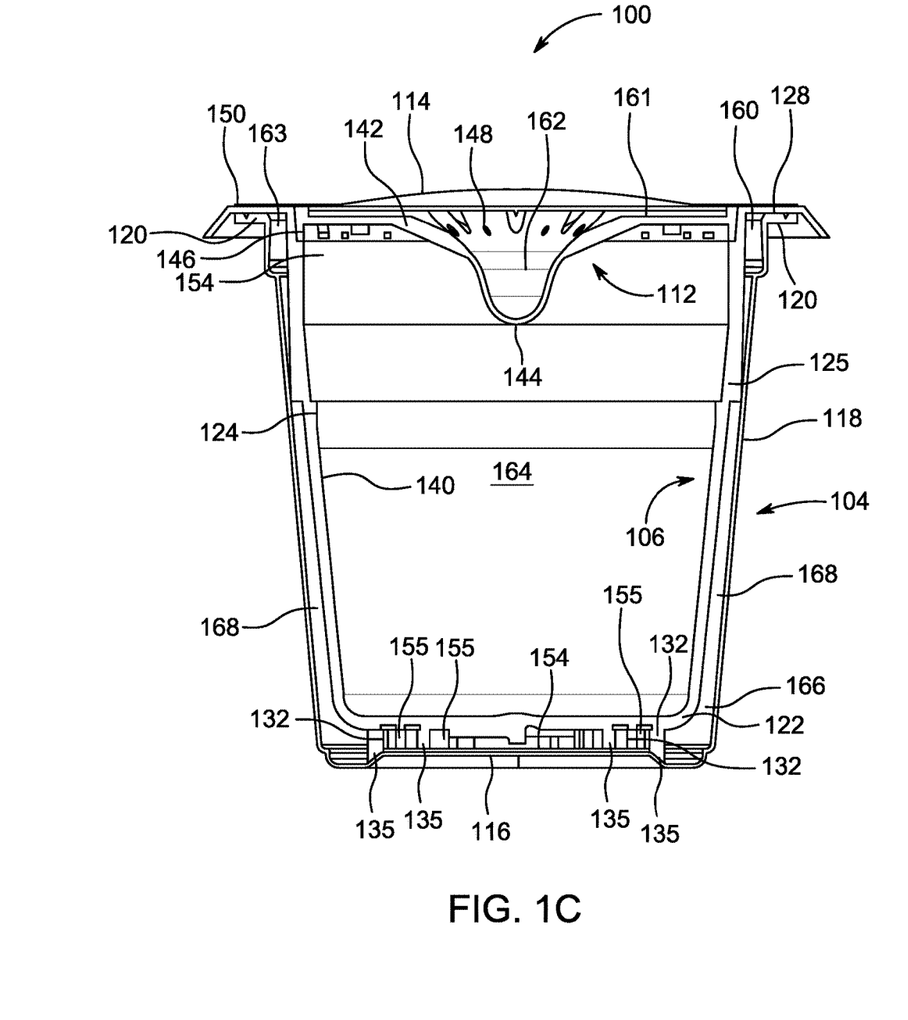
FIG. 1C shows a cross-sectional view of the assembled pod without the beverage ingredient.

FIG. 1C shows a cross-sectional view of an assembled pod 100 without the beverage ingredient 110 where the interior of the container 104 may be divided into different chambers including the cavity 162 that extends outwardly to form the gap 161 between the lid 114 and the base 142 of the distributor as discussed above; and a first chamber 164 and a second chamber 166. The first chamber 164 may be generally defined as the interior space of the filter 106 or the space between the distributor 112 and the second chamber 166. The second chamber 166 may be generally defined as the space between the filter 106 and the container 104. The cavity 162 may be adapted to receive an inlet member (not shown) from a high or low pressure brewing mechanism and the heated water from the inlet may flow along the gap 161 to distribute the heated water in a substantially even manner through the holes 148 to more evenly mix with the beverage ingredient 110 to extract the beverage such as espresso or coffee from the ingredient 110. The base 122 of the filter 106 may be in close approximation to the base 116 of the container 104 to enlarge the first chamber 164 to pack about 6 to 18 grams of coffee ground to brew about 0.8 to about 3 oz of espresso or 6 to 14 oz of coffee. The size and number of holes 136 provided on the base 122 may be predetermined to brew a desired beverage such as espresso or coffee. The circumference or diameter of the sidewall 124 of the filter 106 may be less than the circumference or diameter of the sidewall 118 of the container 104 such that a pathway 168 may be provided between the two sidewalls 124 and 118 around the circumference of the sidewall 124 of the filter 106.

The pod 100 may be assembled in a variety of ways. For example, the opening 160 of the container 104 may be sized to receive the filter 106 such that the first section 128 may rest upon the rim 120 of the container 104. The first section 128 may be releasably sealed to the rim 120. The opening 154 of the filter 106 as defined by the first section 128 may receive the beverage ingredient 110 (not shown) and may be tampered to minimize air pockets within the ingredient 110. The distributor 112 may be placed over the ingredient 110 and substantially enclose the opening 154 of the filter 106. The distributor 112 may have a cavity 162 as defined by the protrusion 144 adapted to receive an inlet member to inject liquid therein. Note that it is within the scope of the invention to have the flap 146 extending upwardly from the base 142 such that there is a sufficient distance between the lid 114 and the base 142 such that protrusion 144 and cavity 162 may not be needed. The lid 114 may be placed over the first section 128 and a circumference near the outer edge 150 of the lid 114 may be sealed to the first section 128 to hermetically seal the ingredient 110 within the pod 100. The distributor 112 may have a plurality of ribs (not shown) protruding toward the lid 114 to maintain a gap between the lid 114 and the distributor 112 such that the liquid injected into the cavity 162 may flow along the gap and drain through the holes 148 and mix with the beverage ingredient 110 there-underneath.

Once the pod 100 is assembled, the lid 114 may represent a proximal end, and the base 116 of container 104 may represent a distal end of the pod 100. The pod 100 may have a first pathway 155 along the distal end of the pod, and a second pathway 168 from the distal end to the proximal end of the pod. In particular, the first pathway 155 may be formed between the base 122 of the filter and the base 116 of the container 104, and a second pathway 168 may be formed between the sidewall 124 of the filter and the sidewall 118 of the container. The first pathway 155 may be formed by extending the distal ends 135 of the individual retainer walls 132 from the base 122 such that distal ends 135 may substantially contour the inner side 154 of the base 116 of the container 104 thereby minimizing the gap between the distal ends 135 and the base 116 or have the distal end 135 engage with the base 116 of the container 104. As discussed in more detail below, the individual retainer walls 132 may be spaced apart from each other thereby forming the first pathways 155 between the adjacent walls 132 with the holes 136 formed in the base 122 along the pathway between adjacent walls. In particular, the holes 136 may be formed between adjacent walls 132, and the walls 132 may have the slits 134 to allow the first pathways 155 to traverse across from the inner wall to the outer walls, as discussed in more detail below.

The extending ribs 125 may engage with the sidewall 118 of the container 104 to center the filter 106 relative to the container 104. This may allow the assembled pod 100 to substantially maintain the second pathway 168 that is substantially uniform between the two sidewalls 118 and 124 around the circumference of the sidewall 124. The second pathway 168 may extend from the distal end of the filter to the proximal end of the pod 100. In particular, the sidewall 124 may generally extend upwardly from the base 122 in a taper or expanding manner relative to the longitudinal axis 102, in part, to enlarge the size of the first chamber 164 to be able to pack more beverage ingredient. As the sidewall 124 extends upwardly towards the proximal end of the pod 100, the sidewall 124 may extend in a substantially parallel manner relative to the longitudinal axis 102 to enlarge a gap 163 between the rim 120 and the sidewall 124 at the proximal end. As discussed in more detail below, the enlarged gap area 163 may slow down the flow of the beverage flowing along the second pathway 168 so that the beverage may drain from the pod more smoothly thereby minimizing spattering of the beverage as it drains.

The extending ribs 125 may also engage with the sidewall 118 of the container 104 during the brewing process such that the lateral force applied to the interior side 140 of the sidewall 124 may transfer to the sidewall 118 of the container 104. During the brewing process, the pod 100 may be placed in the brewing chamber (not shown), which includes a holder (not shown) adapted to receive the pod 100. The holder may support the outer contour of the container 104 such as the sidewall 118 and the base 116, which in turn supports the sidewall 124 and the retainer walls 132 of the filter 106. This may substantially prevent the filter 106 from deforming along the sidewall 124 and the base 122 due to the internal high pressure within the filter 106, such as when brewing high pressure beverages like espresso. That is, the extending ribs 125 between the two sidewalls 124 and 118, and the retainer walls 132 between the two bases 122 and 116 may substantially transfer the stress on the filter 106 to the holder in order to substantially maintain the first and second pathways 155 and 168 open. Note that various components of the pod 100 may be assembled in a variety of different orders, and the assembly process is not limited to the steps discussed above.

Figure 1D:
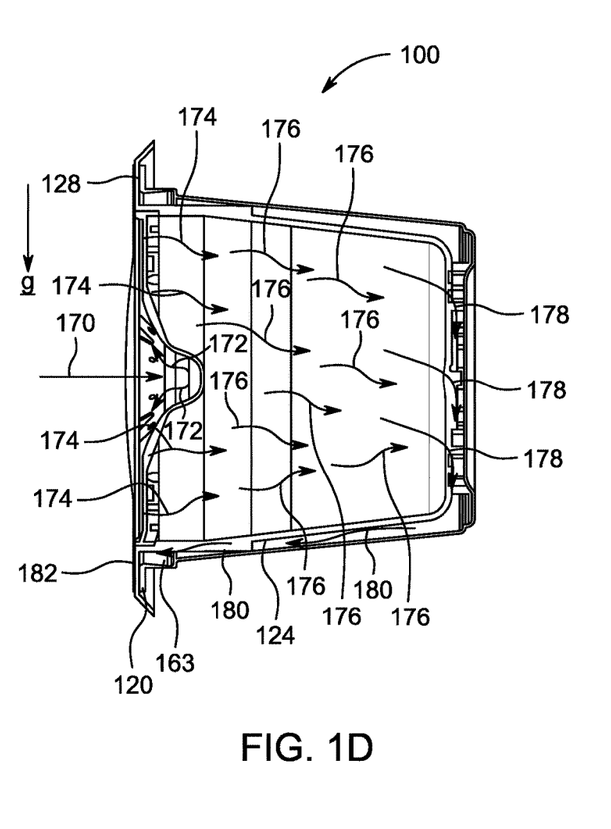
FIG. 1D shows a cross-sectional view of the assembled pod in a brewing orientation.

FIG. 1D shows the pod 100 in a substantially horizontal position in reference to the gravitational direction g, which may be a brewing position of the pod 100. As discussed in more detail below, during the brewing process, the heated water may be injected into the pod 100 through the lid 114 and into the cavity 162 as indicated by the direction arrow 170; and thereafter, the heated water may flow along the following path within the pod 100: (1) as indicated by the direction arrows 172, the protrusion 144 may redirect the heated water towards the lid 114 or the proximal end; (2) as indicated by the direction arrows 174, the heated water may flow along the gap 161 between the lid 114 and the distributor 112 and exit through the holes 148 in the base 142 of the distributor 112 and mix with the beverage ingredient 110 within the first chamber 164; (3) as indicated by the direction arrows 176, the heated water may extract the beverage from the beverage ingredient 110 and the pressure from the heated water injected into the cavity 162 may direct the beverage towards the distal end 122 of the filter 106; (4) as indicated by the direction arrows 178, the beverage may then pass through the holes 136 on the base 122 and flow along the first pathway 155, as discussed in more detail below; and (5) as indicated by the direction arrows 180, with the pod 100 in the substantially horizontal orientation, the gravity may direct the beverage to flow along the second pathway 168, which may be along the six O'clock position of the pod 100 when viewing the first extension 128 as a face on a clock, and the bottom 182 of the first extension 128 may represent the six O'clock position. Note that it is within the scope of the invention to have the pod in a variety of other orientations rather than on a horizontal orientation such as facing downwards or upwards, where in the upward position, the pressure within the pod may force the beverage upwards to drain from the gap.

The external ribs 125 may maintain a uniform second pathway 168 such that the pod 100 may be brewed in any rotational orientation about the first extension 128. In other words, the pod may be inserted into a brewing mechanism in any rotational direction since the gap in the second pathway 168 is substantially similar around the circumference of the two sidewalls 118 and 124. As discussed above, the gap 163 between the proximal end of the sidewall 124 and the rim 120 may be enlarged to slow down the flow of beverage near the proximal end so that the beverage may drain more smoothly from the pod 100 via a gap formed between the extension 126 and the rim 120, as discussed in more detail below. Note that the sidewall 124 of the filter 106 may not have holes to substantially direct the beverage to flow towards the distal end 122 of the filter 106 and substantially prevent the beverage from passing through sidewall 124. However, it is within the scope of the invention to have holes in the sidewall 124 depending on the application. In addition, the distributor 112 may or may not be utilized depending on the application. If the distributor is not utilized, then the heated water from the brewing chamber may be directed towards the beverage ingredient 110.

Figure 1E:
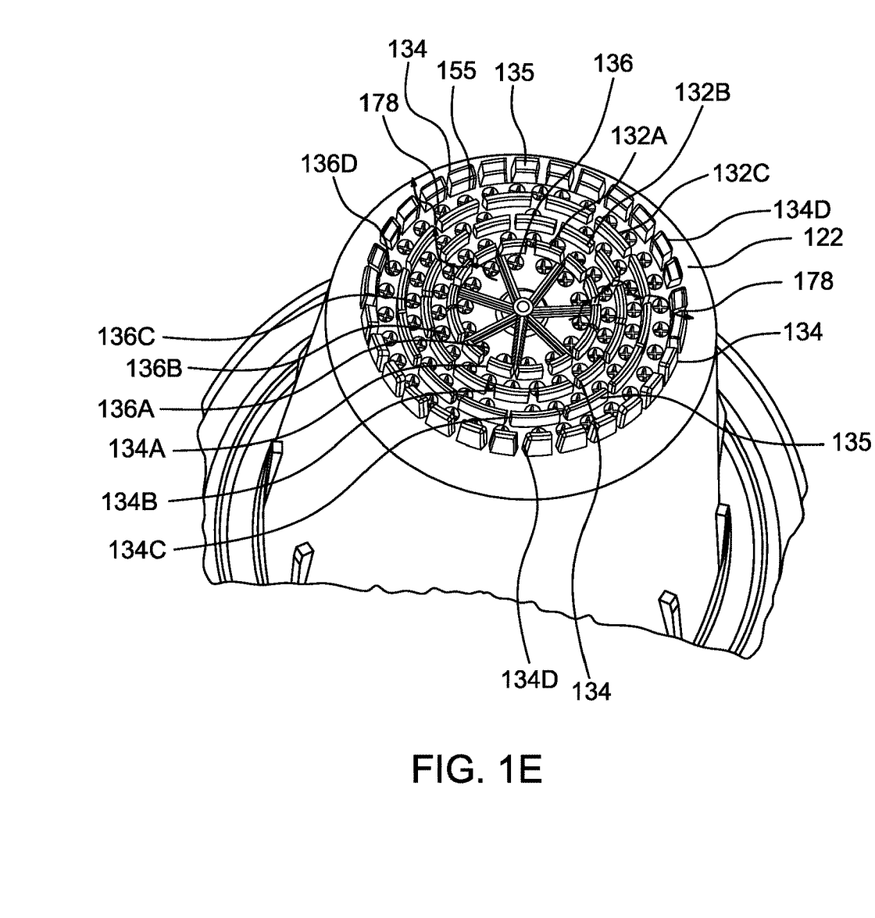
FIG. 1E illustrates an enlarged view of the retainer walls protruding from the base of the filter.

FIG. 1E illustrates an enlarged view of the base 122 with the plurality of retainer walls 132 protruding therefrom. The plurality of walls 132 may be arranged in a variety of arrangements including in a circular manner with multiple layers of walls 132A, 132B, 132C, and 132D space apart from each other with the holes 136 between two adjacent walls, and the inner holes 136A within the inner wall 132A. Each wall may have a plurality of slits 134 where at least a portion or all of the slits 134 may be arranged to be offset relative to the slits in the adjacent wall such that at least a portion of the slits 134 may be misaligned from the inner wall 132A to the outer walls 132B, 132C, and 132D. In addition, once the pod 100 is assembled, the base 116 of the container 104 may substantially enclose the distal end 135 of the retainer walls 132 such that the beverage may be substantially directed to flow pass the slits 134. Accordingly, as the beverage exits from the holes 136, the beverage may traverse through a number of slits 134 in each layer of walls 132A, 132B, 132C, and 134DA, which may take a variety of different paths. In general, the beverage may take a path of least resistance which may generally define the first pathway 155 such as the exemplary staggered flow patterns indicated by the direction arrows 178. That is, a cumulation of the staggered flow patterns 178 may generally define the first pathway 155 between the two bases 122 and 116.

The flow rate of the beverage flowing along the first pathway 155 may be controlled based on a ratio of number of slits 134 that are aligned relative to the slits 134 that are staggered. That is, a portion of the slits in adjacent walls may be aligned with respect to each other to allow the beverage to take more of a direct path from the inner wall 132A to the outer wall 134D, for example, thereby lessening the restriction to the flow of beverage exiting from the holes 136. Accordingly, the greater the ratio of slits that are aligned relative to the slits that are staggered may increase the flow rate, and vice versa; and this ratio may be predetermined to control the flow rate of the beverage exiting the holes 136 depending on the application. For instance, when the pod 100 is packed with coffee, the coffee ground packed in the first chamber 164 may be coarse, as discussed above, such that the beverage may readily pass through the coffee ground and through the holes 136. When the beverage initially exits the holes 136 along the base 122, the flow rate may be relatively high since the first and second pathways 155 and 168 are free of beverage, and as the beverage pours out of the pod 100 through the gap between the extension 128 and the rim 120, as discussed below, at a relatively high flow rate, the beverage may splatter as it drains and possibly contaminates the brewer and/or the beverage, which may be undesirable. In addition, spattering may also occur during the purging stage when air may be pumped into the pod at the end of the brewing cycle to drain the last remaining beverage out of the pod. By staggering at least a portion of the first pathway 155 in a manner discussed above, the beverage draining from the pod may be slowed to minimize the beverage from spattering. Note that it is within the scope of the invention to have all of the slits 134 be aligned extending out radially from the inner wall 132A to the outer walls 132B, 132C, and 132D.

Figure 1F:
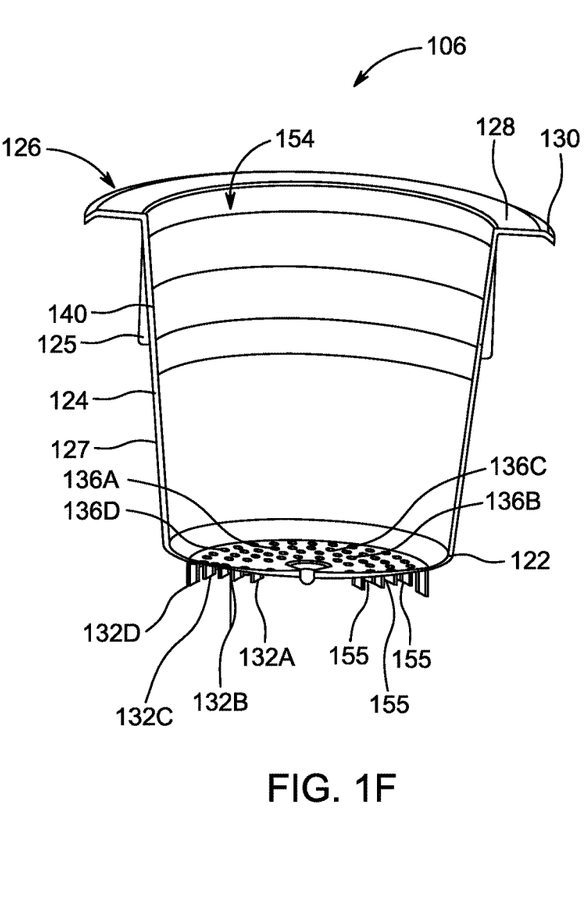
FIG. 1F shows a cross-sectional view of the filter illustrating the holes in the base, and the retainer walls extending underneath the base, separated from each other.

FIG. 1F shows a cross-sectional view of the filter 106 illustrating the holes 136 in the base 122, and the retainer walls 132A, 132B, 132C, and 132D underneath the base 122 separated from each other to provide the first pathway 155 as discussed above. The size and number of holes 136 provided in the base 122 may provide a first stage of filtering the beverage passing through the holes 136, and the size and number of slits 134 provided in the different layer of the retainer walls 132 may provide at least a second stage of filtering the beverage passing through the first pathway 155, thereby minimizing and/or predetermining the size of the sediments in the beverage that pass through the holes 136 and slits 134, along with controlling the speed of the beverage flowing along the first pathway 155. As discussed above in reference to the pod 100, for coffee, an average grind size may be from about 450 to 700 microns, and for espresso, an average grind size may be from about 40 to 400 microns such that the size of the holes 136 may be smaller than the average grind size or less than the lower end of the distribution of the grind sizes to brew coffee, or sized to substantially prevent the average grind size of the beverage ingredient from passing through the hole 136 by having at least one of the dimensions of the hole be less than the average grind size. With such distribution of average grind sizes, the size of the holes 136 to brew coffee may be less than about 450 microns to substantially prevent coffee ground from passing through the holes 136 and to release the pressure within the coffee grounds to brew coffee. With such average grind size of the coffee ground, the hole 136 may be formed from a variety of configurations such as circular, oval, square, rectangle, triangle, or any other regular or irregular shape or any other shape known to one skilled in the art where the longest distance defining the hole 136 may be smaller or equal to the average grind size.

Due to the distribution of grind sizes of the beverage ingredient, some of the sediments may pass through the holes 136, to substantially minimize the unwanted beverage ingredient size or large sediments from draining out of the pod 100. In this regard, the openings or width of the slits 134 in the retainer wall(s) 132 may be equal to or smaller than the size of the holes 136, or equal to or smaller than the average grind size of the beverage ingredient. The width of the slits 134 may be also sized to allow undissolved solid particles to pass therethrough but substantially prevent solid particles greater than the undissolved solid particles from passing therethrough. This may allow the fine and/or micro sediments to pass through the slits 134 with the beverage to add texture and full body and mouth feel to the beverage which may enhance the overall taste experience of the beverage. The fine and/or micro sediments may be undissolved solid particles that pass through the filter during the brewing process; and these micro sediments may bond to some of the acids in the beverage such that when the beverage is consumed, the receptors in the tongue may feel the micro sediments more strongly than the acid such that in terms of taste perception, the consumer may interpret the flavor of the beverage as having less acidic taste.

The heated water injected into the filter 106 may be up to 19 or more bars of pressure to brew coffee or espresso depending on how much pressure is released by the pod 100. For example, with the beverage ingredient 110 packed within the first chamber 164 to brew espresso, the pressure within the first chamber 164 may be greater than along the first pathway 155 such that the larger sediments that may have passed through the holes 136 may not pass through the slits 134 having similar size as the holes 136 or less than the average grind size of the beverage ingredient packed in the first chamber 164. Accordingly, the slits 134 in the retainer wall(s) 132 may provide a second filtering stage for the beverage. In addition, the size of the slits 134 may progressively get smaller from the inner retainer wall 132A to the outer retainer wall 132D, and the number of slits 134 may increase progressively from the inner retainer wall 132A to the outer retainer wall 132D to accommodate more beverage exiting from the outer holes 136. For instance, in reference to FIG. 1E, the beverage passing through the inner holes 136A may pass through the slits 134A in the retainer wall 132A, where the width of the slits 134A may be equal or less than the average grind size of the beverage ingredient or the size of the holes 136A; the beverage passing through the inner holes 136A and 136B may pass through the slits 134B in the retainer wall 132B, where the width of the slits 134B may be equal or less than the average grind size of the beverage ingredient or the width of the slits 134A; the beverage passing through the inner holes 136A, 136B and 136C may pass through the slits 134C in the retainer wall 132C, where the width of the slits 134C may be equal or less than the average grind size of the beverage ingredient or the width of the slits 134B; and the beverage passing through the inner holes 136A, 136B, 136C and 136D may pass through the slits 134D in the retainer wall 132D, where the width of the slits 134D may be equal or less than the average grind size of the beverage ingredient or the width of the slits 134C. As such, as the beverage flows from the inner slits 134A to the outer slits 134 along the first pathway 155, in a staggered manner as discussed above, the smaller sediments may be progressively prevented from passing through as the width of the slits 134 get progressively smaller. Accordingly, the slits 134 may provide multiple layers of filtering to minimize the sediments from draining out of the pod 100.

Figure 1G:
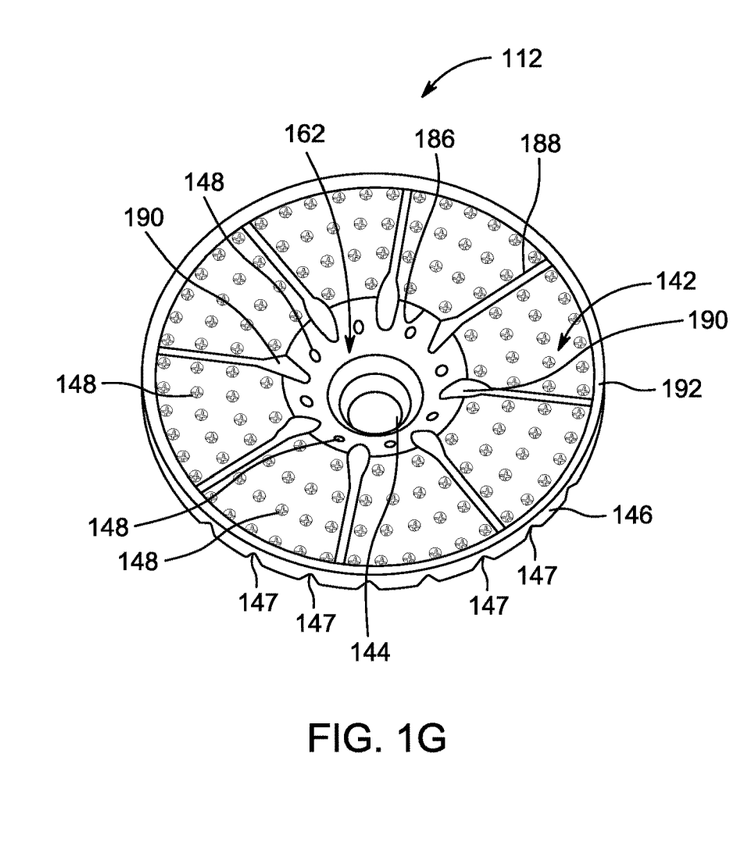
FIG. 1G shows an enlarged perspective view of the distributor.
Figure 1H:
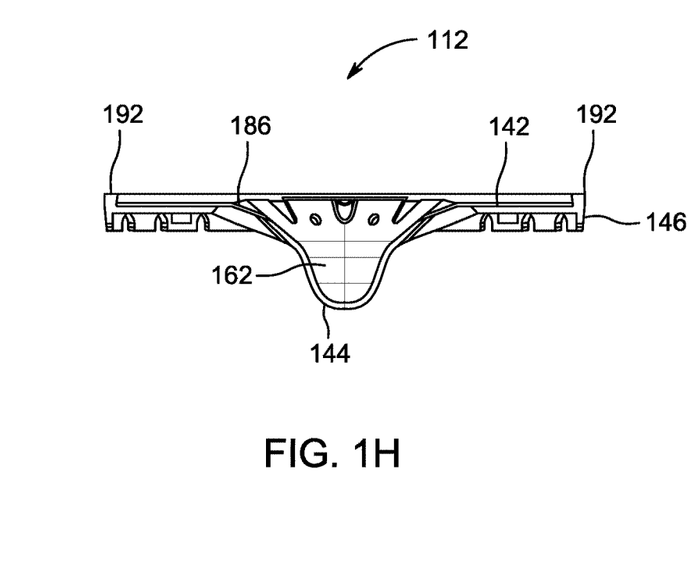
FIG. 1H shows a cross-sectional view of the distributor where a portion of the flap extends upwards.

FIG. 1G shows an enlarged perspective view of the distributor 112 having a base 142 with an outer flap 146 adapted to be received into the opening 154 of the filter 106 and engaged with the inner side 140 of the sidewall 124 of the filter 106, in a manner discussed above. The flap 146 may extend upwardly and/or downwardly relative to the base 142 and have cutouts 147. The base 142 may have a protrusion 144 forming a cavity 162 defining an opening 186 along the base 142. The distributor 112 may have the holes 148 within the protrusion 144 and in the base 142 to allow the heated water to shower the beverage ingredient 110 underneath the distributor 112. The base 142 may have a plurality of radial channels 188 extending from the cavity 162 to the flap 146 to provide a pathway for the water injected into the cavity 162 to flow radially and out of the holes 148. Note that a proximal end 190 of the channel 188 along the cavity 162 may be wider and deeper relative to the channel extending radially to ensure that the water injected into the cavity has a clear passage to the holes 148 in the base 142. The plurality of holes 148 formed on the outer radial portion of the base 142 and the cutouts 147 in the flap 146 may allow the distributor 112 to flex or bend relative to the protrusion 144. FIG. 1H shows a cross-sectional view of the distributor 112 where the flap 146 may also extend upwards where the distal end 192 may be flush with the first extension 128 when the distributor 112 is inserted into the filter 106. As such, once the pod 100 is assembled, as discussed above, the gap 161 may be formed between the lid 114 and the base 142.

Figure 2A:
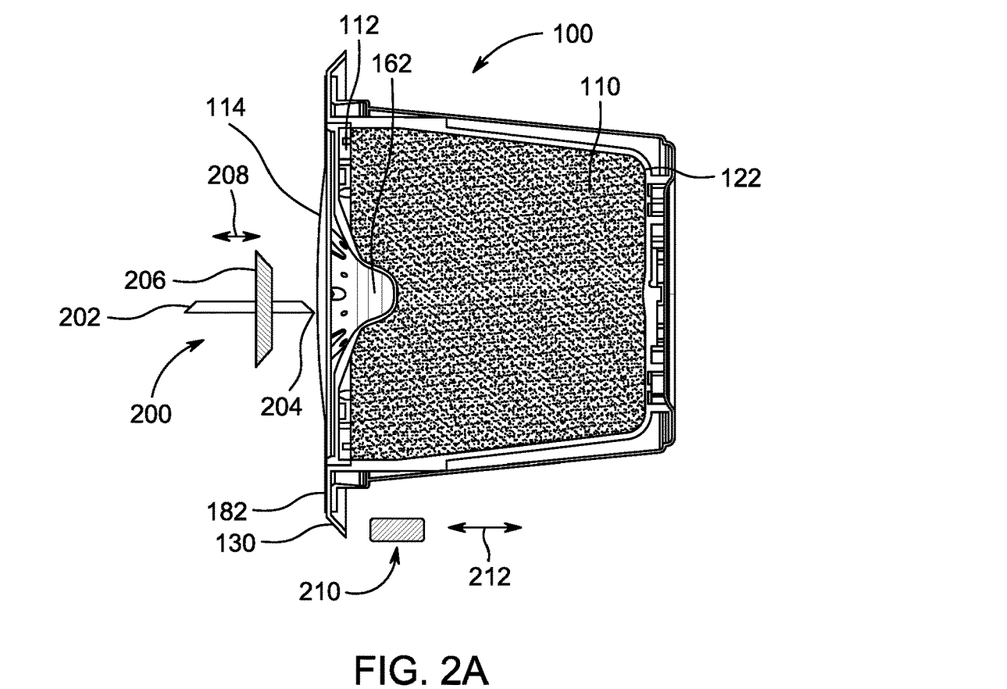
FIG. 2A shows a cross-sectional view of the pod in a brewing orientation juxtaposed to an inlet member and a detaching member.

FIGS. 2A through 2D show cross-sectional views of the pod 100 in different stages to illustrate a manner and method of brewing a beverage with the pod 100. In this example, FIG. 2A shows the pod 100 in a substantially horizontal position or brewing orientation as discussed above in reference to FIG. 1D, packed with beverage ingredient 110 within the first chamber 164. For example, the beverage ingredient 110 may be coffee ground to brew low pressure coffee with an average coffee grind size from about 500 microns to about 1,000 microns, or brew high pressure espresso with an average coffee grind size from about 40 microns to about 400 microns; and the size and number of holes 136 may be smaller than the average coffee grind size to substantially prevent the coffee ground from passing through the holes 136 in the base 122, but release the pressure within the first chamber 164. In the brewing orientation, the pod 100 may be juxtaposed to an inlet member 200 having an inlet end 202 and a tip 204 with a gasket 206 therebetween. The member 200 may be adapted to slide relative to the pod 100 as indicated by the double ended direction arrow 208, or the pod may be adapted to slide relative to the member 200, or both elements 100 and 200 may be adapted to slide or move relative to each other simultaneously or sequentially. The member 200 may be positioned relative to the pod 100 such that the tip 204 may be juxtaposed to the lid 114 in order to penetrate the cavity 162 of the distributor 112. The pod 100 may also be juxtaposed to a detaching member 210 position behind the second extension 130 at about the six O'clock position 182, as discussed above in reference to FIG. 1D, and in reference to the gravitational direction g. The detaching member 210 and the pod 100 may be adapted to slide relative to each other as indicated by the double ended direction arrow 212 where one or both elements 100 and 210 may move relative to each other simultaneously or sequentially.

Figure 2B:
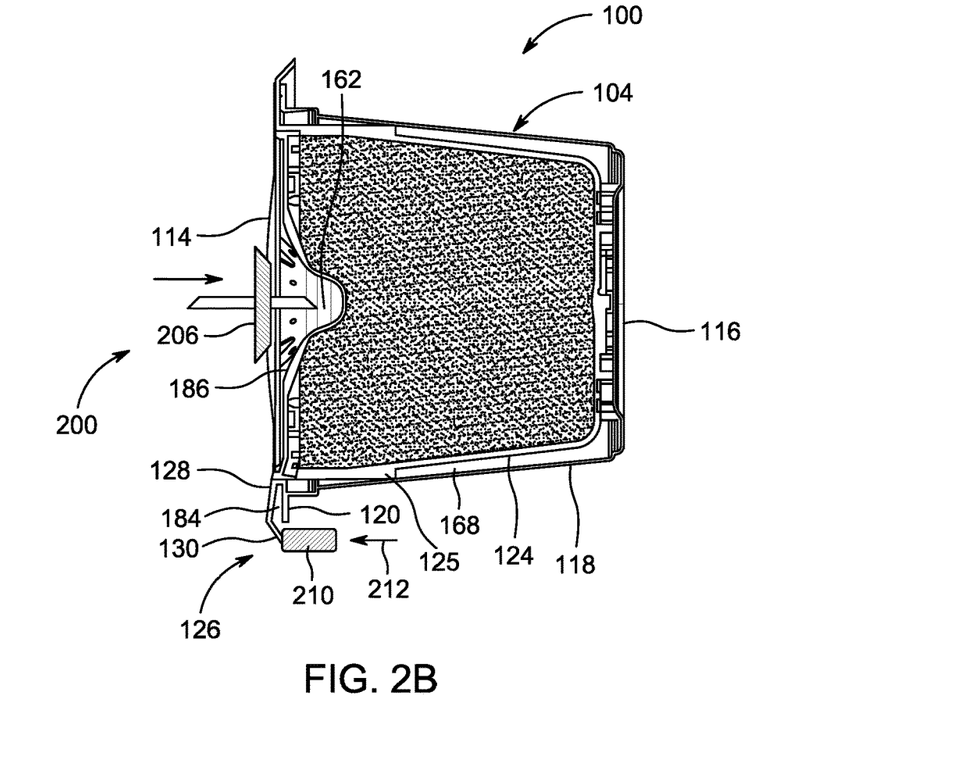
FIG. 2B shows a cross-sectional view of the pod with the inlet member piercing through the lid and the detaching member separating the extension of the filter from the rim of the container to form a gap therebetween.

FIG. 2B shows that to begin the brewing process, the inlet member 200 may pierce, puncture, or cut through the lid 114, or use any other apparatus or method known to one skilled in the art, and the tip 204 may rest within the cavity 162, and the gasket 206 may engage with the lid 114 surrounding the member 200 to substantially prevent the water from leaking out of the opening between the member 200 the lid 114 formed by the punctured hole within the lid. The detaching mechanism 210 may move towards an extended position as indicated by the direction arrow 212 to engage with the second extension 130 to separate the first extension 128 from the rim 120 near the six O'clock position 182 thereby forming a gap 184 between the extension 126 and the rim 120 that may extend from about four O'clock to about eight O'clock positions; and in particular from about five O'clock to about seven O'clock positions. The second section 130 may taper towards the base 116 of the container 104 such that the underside of the second section 130 may form a concave shape or hook to allow the detaching member 210 to engage with the underside of the second section 130 to separate the first extension 128 from the rim 120 more consistently.

FIG. 2B also shows that the diameter of the gasket 206 may be smaller than the diameter of the opening 186 forming the cavity 162, as discussed above in reference to FIGS. 1G and 1H, such that the force applied by the gasket 206 onto the lid 114 may not directly transfer to the distributor 112 to minimize the resistance upon the extension 126 to allow the detaching mechanism 210 to separate the first extension 128 from the rim 120 and to substantially maintain the gap 184 opening. The newly formed gap 184 may form a part of the second pathway 168 between the two sidewalls 118 and 124 and also between the adjacent extending ribs 125 to allow the beverage formed within the pod 100 to flow along the second pathway 168 and drain through the gap 184, as discussed in more detail below.

Figure 2C:
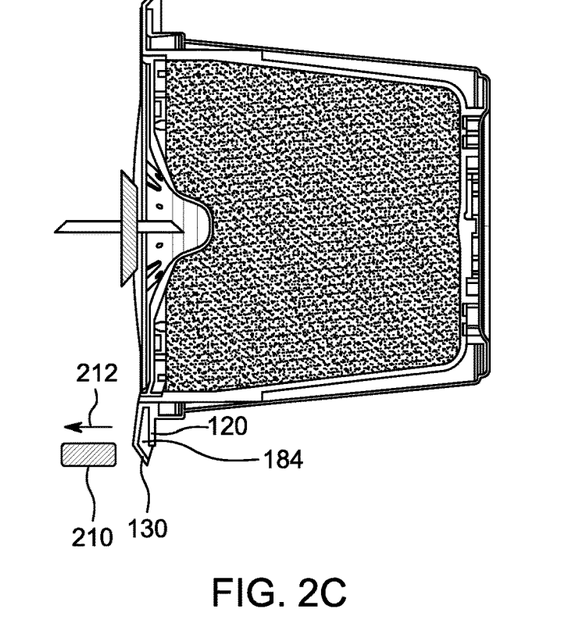
FIG. 2C shows the detaching member being on the opposite side of the lid to not interfere with the path of the beverage draining from the gap between the extension and the rim.

FIG. 2C illustrates that as the detaching member 210 moves further towards the inlet member 200 as indicated by the direction arrow 212, the second extension 130 may flex to allow the detaching member 210 to pass and rest on the opposite side of the extension such that the detaching member 210 may not interfere with the beverage draining out of the gap 184. Once the gap 184 is formed, a combination of the rim 120 and the concave shape of second extension 130 that extends downwardly may act as a spout to allow the beverage to pour from the gap 184 in a smooth manner to minimize spattering of the beverage. This may provide a clear path for the beverage to drain from the pod 100 without coming to contact with the brewing mechanism to avoid contaminating the beverage, as discussed in more detail below.

Figure 2D:
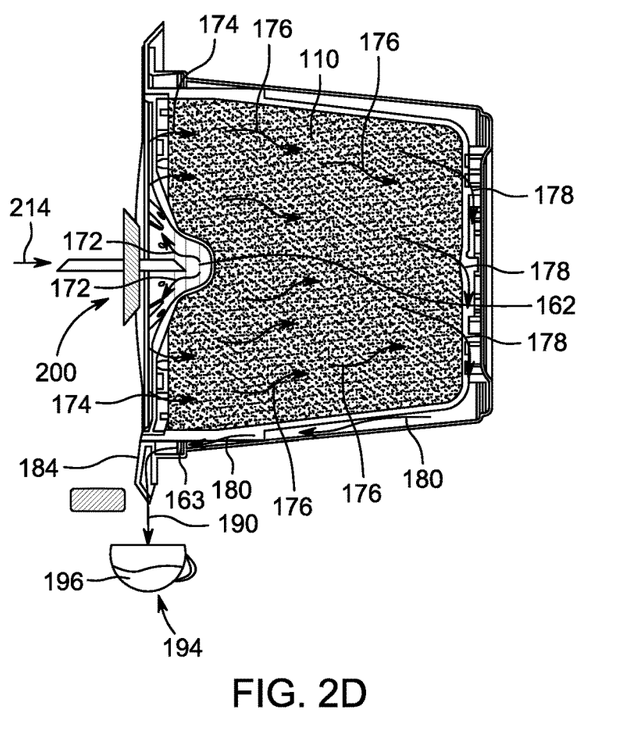
FIG. 2D shows the pod brewing in a substantially horizontal position and draining the beverage unobstructed by the brewing mechanism.

FIG. 2D shows the inlet member 200 injecting heated water 214 into the cavity 162. Depending on the application, the heated water 214 may be provided at a low pressure from about 1 to about 4 bars and/or at a high pressure from about 6 to 15 bars. In reference to FIG. 1D, the heated water 214 may flow along the path as indicated by the direction arrows 172 and 174, and the beverage 196 extracted from the beverage ingredient 110 may flow along the path as indicated by the direction arrows 176, 178, and 180, and drain out of the gap 184 as indicted by the direction arrow 190 and pour the beverage 196 into a mug 194. In particular, the flow of the beverage 196 may be controlled to drain smoothly from the pod 100 based on the following: (1) the beverage 196 flowing along the first pathway 155 may be controlled based on the ratio of the slits 134 in the retainer walls 132 being aligned compared to slits 134 being staggered, as discussed above in reference to FIG. 1E; (2) during the brewing process, the extending ribs 125 may substantially maintain the second pathway 168 uniformly open from the distal end to the proximal end, as discussed in reference to FIG. 1C; (3) the gap 163 in the proximal end of the pod 100 between the rim 120 and the sidewall 124 may be enlarged where the greater opening may slow down the beverage 196 to flow more smoothly near the proximal end along the second pathway 168; and (4) once the gap 184 is formed, the combination of the rim 120 and the concave shape of second extension 130 that extends downwardly may act as a spout to allow the beverage to pour from the gap 184 in a smooth manner to minimize spattering of the beverage. Accordingly, once the beverage 196 passes through the holes 136, the beverage 196 may flow along the first and second pathways 155 and 168, respectively, in a controlled and smooth manner, and also drain smoothly via the gaps 163 and 184 indicated by the direction arrows 178, 180, and 190; and pour into the mug 194 unobstructed by the brewing mechanism to substantially avoid contaminating the beverage and the brewing mechanism. In addition, the slits 134 in the retainer walls 132 may form a second stage or multiple stages of filtering as the beverage 196 flows along the first pathway 155, as discussed above, to brew a more cleaner tasting beverage with less sediment. Accordingly, the pod 100 may be brewed in a substantially horizontal position to brew and drain the beverage from the pod unobstructed by the brewing mechanism.

While various embodiments of the invention have been described, it will be apparent to those ordinarily skilled in the art that many more embodiments and implementations are possible within the scope of this invention. Moreover, various features and functionalities described in this application and Figures may be combined individually and/or a plurality of features and functionalities with others. Accordingly, the invention is not to be restricted except in light of the attached claims and their equivalents.

What is claimed is:

1. A beverage pod having a proximal end and a distal end, the pod comprising:
    a container having a rim defining an opening on the proximal end, a base on the distal end, and a sidewall between the rim and base;
    a filter having an extension defining an opening on the proximal end, a base with holes adjacent to the base of the container, at least one retainer wall with slits between the base of the filter and the base of the container, and a sidewall between the extension and the base of the filter, where the extension is peelably coupled to the rim;
    a beverage ingredient disposed within the filter;
    a lid enclosing the beverage ingredient within the filter, and the lid adapted to be pierced to inject water into the filter; and
    a beverage pathway when the lid is pierced and a gap is formed between the extension and the rim, along the holes in the base of the filter, along the slits between the distal end of the filter and the distal end of the container defining a first pathway, along a space between the sidewall of the filter and the sidewall of the container from the distal end of the filter to the proximal end of the pod defining a second pathway, and along the gap juxtaposed to the proximal end of the pod.

2. A beverage pod as defined in claim 1, further including a distributor having a base with a plurality of holes with a protrusion therein defining a cavity adapted to receive heated water, and the distributor in between the lid and the beverage ingredient.

3. A beverage pod as defined in claim 2, where the extension comprises a first section and a second section, the first section extending outwardly and peelably coupled to the rim, and the second section extending farther thereof relative to the first section and at least partially in the direction of the distal end of the filter.

4. A beverage pod as defined in claim 1, where the at least one retainer wall extends from the base of the filter, and the retainer wall has a distal end that contours and engages with the base of the container, and the retainer wall has a plurality of slits to slow the flow of beverage along the first pathway.

5. A beverage pod as defined in claim 1, where the base of the filter has a plurality of retainer walls extending therefrom with distal ends that contour and engage with the base of the container, and at least a portion of the retainer walls have slits that are misaligned relative to the slits in the adjacent retainer wall to stagger the first pathway to control the speed of the beverage flowing along the first pathway.

6. A beverage pod as defined in claim 5, where at least a portion of the retainer walls have slits that are aligned relative to the slits in the adjacent retainer wall such that a ratio of the slits that are misaligned relative to the aligned slits control the speed of the beverage flowing along the first pathway.

7. A beverage pod as defined in claim 5, where the plurality of retainer walls is layered from an inner retainer wall to an outer retainer wall, and the width of the slits get progressively smaller from the inner slits to the outer slits.

8. A beverage pod as defined in claim 1, where the slits filter the beverage passing therethrough to substantially prevent large particles from passing therethrough and allowing undissolved solid particles from passing through the slits.

9. A beverage pod as defined in claim 1, where the width of the slits is less than an average grind size of the beverage ingredient.

10. A beverage pod as defined in claim 1, where the holes have a predetermined size and number to control the flow of a beverage through the holes to provide a desired pressure within the filter.

11. A beverage pod as defined in claim 1, where the filter has a chamber adapted to pack the beverage ingredient therein and the filter is formed from a substantially rigid material to substantially maintain its shape under at least 8 bars of internal pressure within the chamber.

12. A beverage pod as defined in claim 1, where the distal end of the filter is in close approximation to the distal end of the container.

13. A beverage pod as defined in claim 1, where the sidewall of the filter has at least one stiffener to stiffen the sidewall.

14. A beverage pod as defined in claim 1, where the at least one stiffener is an outwardly-extending rib that is juxtaposed to the sidewall of the container.

15. A beverage pod as defined in claim 1, where the filter has a strength sufficient to withstand a water pressure of at least 8 bars.

16. A method of brewing a beverage from a beverage pod having a lid as a proximal end and a base as a distal end defining a longitudinal axis therebetween, the method comprising:
    orientating a pod in a brewing orientation, the pod having a filter disposed within a container where an extension of the filter overlaps a rim of the container, and the extension is peelably coupled to the rim on the proximal end of the pod;
forming a gap between the extension and the rim at about a six o'clock position of the extension at the proximal end of the pod;
receiving heated water at the proximal end of the pod;
extracting a beverage from a beverage ingredient within the filter;
filtering the extracted beverage at a distal end of the filter;
slowing the flow of the beverage along a first pathway between the distal end of the filter and the distal end of the pod;
directing the flow of the beverage along a second pathway from the distal end of the filter to the proximal end of the pod; and
draining the beverage from the gap juxtaposed to the proximal end of the pod.

17. The method as defined in claim 16, where the brewing orientation is when the longitudinal axis of the pod is in a substantially horizontal position.

18. The method as defined in claim 16, where the step of draining drains the beverage unobstructed by a brewing mechanism until the beverage pours into a receptacle.

19. The method as defined in claim 16, where the step of slowing staggers the flow of beverage along the first pathway to slow down the flow of the beverage.

20. The method as defined in claim 16, where the step of slowing includes a plurality of retainer walls between the distal end of the filter and a distal end of the pod, and at least a portion of the retainer walls have slits that are misaligned relative to the slits in the adjacent retainer wall to stagger the first pathway to control the speed of the beverage flowing along the first pathway.

21. A beverage pod as defined in claim 20, where at least a portion of the retainer walls have slits that are aligned relative to the slits in the adjacent retainer wall such that a ratio of the slits that are misaligned relative to the aligned slits control the speed of the beverage flowing along the first pathway.

22. A beverage pod as defined in claim 20, where the plurality of retainer walls is layered from an inner retainer wall to an outer retainer wall, and the width of the slits gets progressively smaller from the inner slits to the outer slits.

23. A beverage pod as defined in claim 16, where the step of slowing includes at least one retainer wall having slits between the distal end of the filter and a distal end of the pod, where the slits are sized to control the flow speed of the beverage flowing along the first pathway.

24. A beverage pod as defined in claim 16, including a second filtering step includes at least one retainer wall having slits between the distal end of the filter and a distal end of the pod, where the slits are sized to substantially prevent sediments in the beverage from flowing past the first pathway.

25. The method as defined in claim 16, further including a second filtering of the beverage along the first pathway to reduce sediments in the beverage.

26. The method as defined in claim 16, further including distributing the heated water onto the beverage within the filter.

27. The method as defined in claim 16, further including directing the extracted beverage towards the distal end of the filter.

28. The method as defined in claim 16, where the beverage ingredient has an average size from about 400 to about 700 microns.

29. The method as defined in claim 16, further includes:
injecting water into the filter of at least 8 bars;
packing beverage ingredient into the filter where an average size of the beverage ingredient is from 40 to 400 microns; and
maintaining substantially the high pressure within filter to brew a high pressure beverage.

30. A method of filtering a beverage from a beverage pod, the method comprising:
filtering the beverage in a first stage within the beverage pod to substantially prevent solid particles having at least first size from passing therethrough the first stage; and
filtering the beverage in a second stage within the beverage pod to substantially prevent solid particles having at least second size from passing therethrough the second stage where the second size is less than the first size;
wherein the beverage pod has a lid as a proximal end and a base as a distal end defining a longitudinal axis therebetween, and the first stage of filtering is juxtaposed to the distal end of the beverage pod.

31. The method according to claim 30, further including:
filtering the beverage in a third stage within the beverage pod to substantially prevent solid particles having at least third size from passing therethrough the third stage where the third size is less than the second size.

32. The method according to claim 30, where the second stage of filtering is juxtaposed to first stage of filtering.

33. The method according to claim 30, where the second size is not greater than the size of undissolved solid particles in the beverage.

34. The method according to claim 30, where the second stage of filtering allows undissolved solid particles to pass therethrough and substantially prevent solid particles having sizes greater than the size of the undissolved solid particles.

* * * * *